M. D. Whipple.
Combing Mach.

No. 3,610.

Reissued Aug. 17, 1869.

N. PETERS, PHOTO-LITHOGRAPHER, WASHINGTON, D. C.

UNITED STATES PATENT OFFICE.

MILTON D. WHIPPLE, OF CAMBRIDGE, MASSACHUSETTS, ASSIGNEE, BY MESNE ASSIGNMENTS, OF HIMSELF.

IMPROVEMENT IN MACHINES FOR COMBING COTTON.

Specification forming part of Letters Patent No. 21,932, dated October 26, 1858; Reissue No. 3,610, dated August 17, 1869.

*To all whom it may concern:*

Be it known that I, MILTON D. WHIPPLE, formerly of Charlestown, in the county of Middlesex and State of Massachusetts, now residing in Cambridge, in the county and State aforesaid, have invented certain new and useful Improvements in Machines for Combing Cotton; and I do hereby declare that the following is a full, clear, and exact description of the same, reference being had to the accompanying drawings, making a part of this specification, in which—

Figure 1:
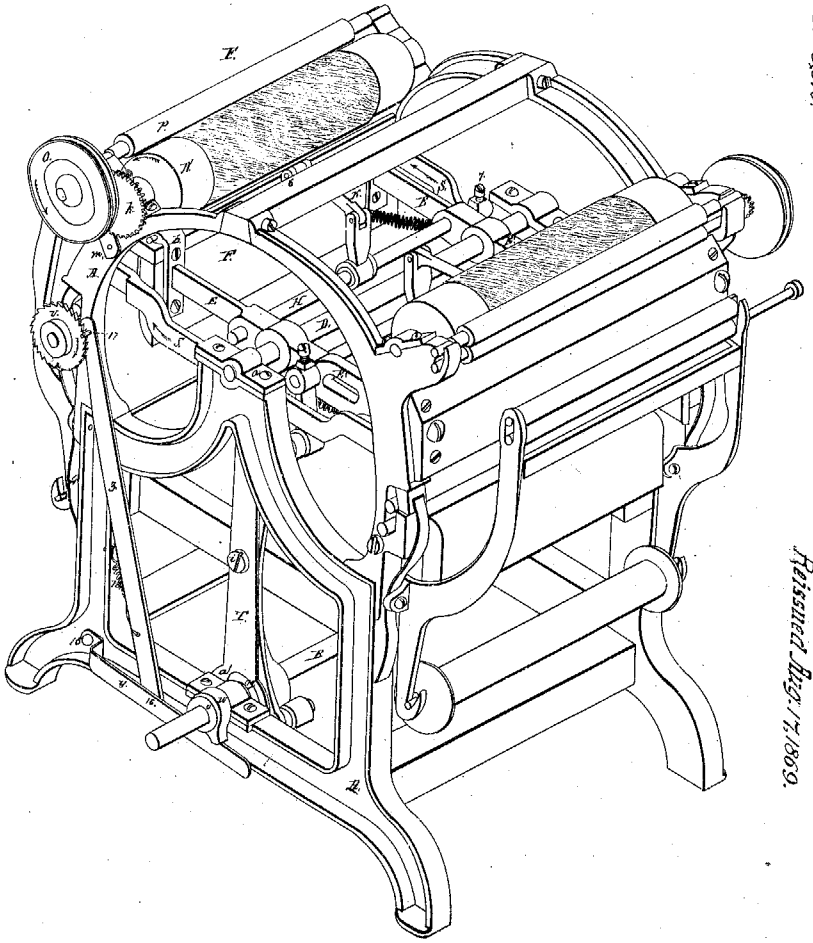
Figure 1:
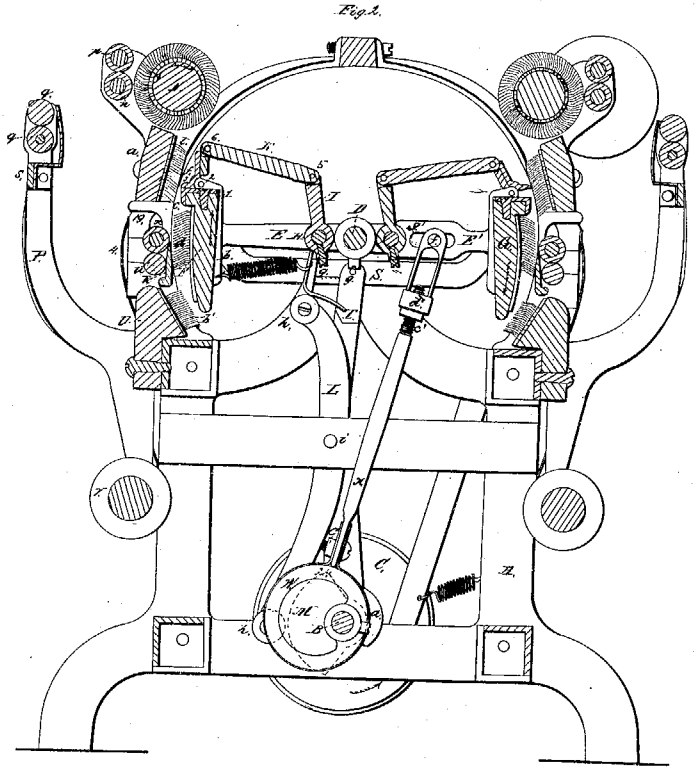

Figure 1 represents a perspective view of the machine, and Fig. 2 represents a vertical transverse section through the same.

Similar letters of reference, where they occur in the separate figures, denote like parts of the machine in both of the drawings, first premising that the drawings represent a double-acting combing-machine having two sets of cards, nippers, and doffers so arranged that as the arms which carry the nippers are vibrated, and one pair of nippers is carrying the cotton which it has drawn from the feed-rolls up to one doffer, the other pair of nippers will be returning for a fresh supply to be carried up to the other doffer, as will be hereinafter more fully explained. It is evident, however, that the machine may be made single-acting, or with one pair of nippers and one doffer.

To enable others skilled in the art to make and use my invention, I will proceed to describe the same with reference to the drawings.

On the frame A are arranged suitable bearings, in which is supported the driving-shaft B, to which motion is communicated by means of the pulley C, Fig. 2.

A rocking shaft, D, near the upper part of the machine, has its bearings at *a*, and has secured to it, near each end, a pair of arms, E E′, which extend laterally each way from the shaft and carry at their ends heavy blocks—viz., on one side the arms E carry at their outer ends the block F, and the arms E′ carry the block G. Each of these arms terminates in a clamp, *b*, to which the block is secured.

As the operating parts on each side of the machine are substantially alike, I will describe the construction, arrangement, and operation of but one set, as follows:

The block F, which extends across the machine inside of the frame A, is secured rigidly to the clamps *b* on the ends of the arms E, and this block has attached to its face a card, *d*, the points of the teeth of which incline downward. A strip or plate of metal, *c*, extending the whole length of the block, is secured by screws 1 to the top of it. A piece of metal, *f*, of the form shown in section, Fig. 2, also extends the length of the block F, and it is hinged near each end to the upper part of the clamp *b*, at 2, the clamp being bent over the top of the block F, as shown in Fig. 2. As the piece *f* is vibrated on its pivots 2, (in a manner which will be presently explained,) the lower portion or jaw, 3, of said piece shuts down in contact with the strip *c*, forming with it a pair of nippers, which are opened and closed at proper intervals, as follows: A shaft, H, lying parallel to the shaft D, has its bearings in and projects through the arms E, between the shaft D and the ends of the arms. To this shaft H is secured, at or near the middle of its length, by a screw, 14, the short arm I, to which is pivoted, at 5, another arm, K, the other end of which is pivoted at 6 to the top of the piece *f* of the nippers. A short arm, *g*, is secured to the outer end of the shaft H, beyond the arm E, and hangs down below it. This arm *g* is secured to the shaft H by a set-screw, 7, Fig. 1, and is continued down and bent back, as at 8, Fig. 2. A spring, *e*, draws the lower end of the arm *g* toward the block F and opens the jaw 3 of the nippers. This jaw is held open during the descent of the block F, and is closed and held shut during its ascent in the following manner: A bent lever, L, having a friction-roll, *h*, at each end of it, is pivoted at *i* to a cross-brace at one end of the frame A of the machine. This lever is vibrated at proper intervals by a cam, M, (dotted in Fig. 2,) secured to the shaft B, which bears against the friction-roll at the lower end of the lever and presses the upper end against the arm *g*, which closes the jaw 3 of the nippers. The cam M is so formed that it shall retain the lever L in the position shown in Fig. 2 for a certain period of time, while the bent portion 8 of the arm *g* is so arranged that it will bear against the friction-roll *h* at the upper end of the lever L during the ascent of the block F and arms E, and thus keep the jaw 3 shut until the block F has reached the highest point to which it ascends, at which time the roll *h* drops off the point 24 of the cam M, when the retraction of the spring *e* opens the jaw 3. A doffer, N, is supported in suitable bearings in the frame A, and is revolved in the direction of its arrow by the gear *k* on the end of its shaft engaging with a small intermediate gear on an arm, *m*, which gear in turn engages with one on the end of the roll *n*, that strips or aids in stripping the doffer.

To the roll *n* there is attached a pulley, O, over which and over a pulley, *o*, on the drive-shaft B, a belt or cord passes to give motion to the roll *n*. Another roll, *p*, lies immediately over the roll *n*, and these rolls take the lap from the doffer N and deliver it to a pair of calender-rolls, *q*, hung on the arms P, which rise from the back of the frame A. Before entering these latter rolls, however, the lap is passed through a hole in a piece of sheet metal, *r*, which rises from the cross-brace *s*, which connects and steadies the arm P. The sliver is thus condensed in the usual manner to pass into the can. The rolls *q* are driven by a cord or belt over a small pulley on the shaft of one of them, which passes over the pulley *o*, before referred to. (The cords or belts are not shown in the drawings.)

Immediately below the doffer N there is secured to the frame A a block, Q, which extends across the machine, and to the face of this block is attached a card, *t*, the teeth of which incline downward. Beneath the block Q, and running in suitable bearings in the frame, is a pair of feed-rolls, the lower one, *u*, of which runs in permanent bearings and carries on the end of its axle or shaft (which projects beyond the side of the frame) a ratchet-wheel, *v*, Fig. 1. The shaft of the other roll, *x*, runs in loose bearings 19, which are held up to the frame at each end of the shaft by a spring, 4, attached to the frame. This allows the roll to be pushed back or away from the center of the machine at intervals, as will be hereinafter explained.

The ratchet-wheel *v* is fed in the direction of its arrow, one notch at each revolution of the shaft B, in the following manner: A cam, *w*, on the shaft B vibrates a lever, *y*, pivoted at 15 to the side of the frame A, and to this lever *y*, near the middle of its length, is pivoted, at 16, a long rod, *z*, in the upper end of which is inserted a pin, 17, that engages with the teeth of the wheel *v* and moves this wheel one notch at each vibration of the lever *y*. A spring, 18, secured to the lower end of the rod *z* and to the frame A at a point somewhat higher up, tends to keep the lever *y* in contact with the cam *w*, and also the pin 17 in contact with the wheel *v*.

A rigid bar or knife-edge, R, (of the form shown in section in Fig. 2,) extends across from one side of the machine to the other between the rolls *x* and *u* and the path of the card *d*. This bar is so placed with respect to the rolls that the upper edge of it (which is comparatively thin) shall be almost in contact with the roll *x* when this roll is pressed in by the spring 4, and the lap, which is being fed through between the rolls *x* and *u* and over the edge of the bar R, will be held by the pressure of the spring 4 between the roll *x* and the knife-edge for a certain interval of time. When, however, it is requisite that the grasp of the roll *x* be relieved to allow the nippers to draw out the fibers, this roll is moved back from the knife-edge in the following manner: A bar, S, the notched end of which bears against the axle of the roll *x*, is pivoted at 9 in the middle of its length to a broad flat lever, T, which is pivoted at *i* to a cross-brace of the frame A, and is forked at its lower end, forming a cam, *a'*, that embraces the shaft B between the side of the frame and the cam M, previously spoken of. A pin, 10, Fig. 1, projects from the side of this latter cam into the cam *a'*, and vibrates the lever T at the proper intervals. This causes the bar S to push back the roll *x* from the bar R and allow the fibers to be drawn through between the roll and the bar. The system consisting of the bar S, lever T, and its cam is in duplicate at the other end of the machine, so that as the lever T is vibrated in one direction the two bars S will bear one against each end of the roll *x* and push it back square, (or without throwing it out of parallelism with the roll *u*.) The next vibration of the levers T in the opposite direction operates in the same manner the roll *x*, belonging to the set of machinery on the opposite side of the machine.

Immediately beneath the rolls *x* and *u*, and extending across the machine to the frame A, to which it is rigidly attached, is another block, U, to the face of which is attached a card, *b'*, similar to the card *t* above the rolls. Both of these cards are inclined so as to bring their faces nearly in a circle, of which the shaft D is the center. A spool, V, hung on the lower part of the arms P, carries the lap, which is led up to the feed-rolls above it.

I have heretofore described the parts and their arrangement on one side of the machine only, as thus far the parts on the other side have been similar with the cams which operate the machinery on one side, secured to one end of the shaft B, and those which operate the machinery on the other side, secured to the other end of the shaft; but as the two pairs of arms E E' are cast together, it only requires that one pair be vibrated to cause the other pair to move in the opposite direction, the shaft D, to which they are attached, rocking in its bearings *a*. These vibrations are effected in the following manner: An eccentric, W, secured to the shaft B, near one side of the frame, is embraced by a strap which is attached at *c'* to a pitman, X, the upper end of which is connected to one of the arms E' in a manner which allows of an adjustment of the vibration of the arms. Thus a screw, *e'*, on the end of the pitman enters a nut, $d'$, while a screw-bolt, $f'$, passes through a slot, $g'$, in the arm and enters the head of the nut $d'$. (A nut and washer secure the bolt $f'$ in its position in the slot $g'$.) This gives two means of adjusting the vibration of the arms E′: first, by altering the length of the pitman, and, second, by altering the point at which it is attached to the arm E′.

The operation of this machine is as follows: The lap of partially-prepared cotton is brought to the machine on the spool V, from which the end is led up between the feed-rolls $x$ and $u$, whence it passes over the edge of the bar R. The shaft B being driven in the direction of the arrow on the pulley C, the arms E will be vibrated in the manner above described, the card $d$ on the block F will be brought down past the knife-edge R, and the fibers of the end of the lap which project over the knife-edge will be combed out straight by this card. The pressure of the spring 4 causes the roll $x$ to nip the lap between itself and the edge of the bar R. This prevents the fibers from being drawn through by the card $d$ as it descends, and the card thus combs out and lays straight the ends of the fibers of cotton which project over the knife-edge (the other ends of the fibers being held between the roll and the knife-edge) and combs off the waste and "noil." After the card $d$ has performed its work on the projecting fibers, the arms E continue their descent, the jaw 3 of the nippers on the block F (which has been held open during the descent by the spring $e$) is closed onto the fibers by the vibration of the lever L, operated by the cam M on the shaft B. The block F now begins to ascend, and at this instant the levers T are vibrated, and the bars S, attached to them, are moved in the direction of their arrows. This pushes back the roll $x$ away from the bar R sufficiently to allow the lap to be fed up, and at the same time the nippers draw the fibers from the end of the lap and carry them up past the face of the card $t$, by which the other ends of these same fibers are combed out as the block F ascends. Then as the block F reaches the upper limit of its vibration the lower end of the lever L drops off from the cam M, and the spring $e$ opens the jaw 3 and delivers the combed cotton onto the doffer N, from whence it is stripped off by the rolls $p$ and $n$ and passes between them to the callender-rolls $q$ through piece $r$. As a portion of the fibers is drawn out by the nippers from the end of the lap, (and before the card $d$ again descends,) a fresh portion of the lap is fed up by the cam $w$, vibrating the lever $y$ and revolving the ratchet-wheel $v$ one or more notches, as required, the nippers drawing the lap up between the rolls $x$ and the bar R. When this has been done, the levers T are vibrated in the opposite direction, and the bars S being drawn away from the roll $x$, the spring 4 presses this roll up and nips the lap, as before explained. While the feed is taking place, the lap, as it comes through the rolls, will be drawn up between the upper roll and the knife-edge, and then the fibers which are grasped by the nippers will be torn off from the lap, to be carried up past the card above the rolls. As the block F again descends to repeat these operations, the card $t$ is cleaned by the card $d$, which passes in contact with it, and this latter card is in turn cleaned at its next ascent by the card $b'$, which is in its turn cleaned by the card $d$ as it descends. It will be observed that the vibrations of the arms E and E′ alternate, and that when the block F is ascending, as represented in the drawings, the block G of the other set of machinery is descending, the parts connected with one side are performing their functions, though with alternate movements, at the same time with the parts connected with the other side of the machine, which thus becomes, in a measure, double acting. The roll $x$ and the knife-edge R grasp the lap in a manner similar to a pair of jaws, and as the nippers on the block F can approach close to the edge of the bar R, I am enabled to grasp and draw out the shorter fibers of the cotton.

Having thus fully described my invention, what I claim therein as new, and desire to secure by Letters Patent, is—

1. The vibrating elastic feed-roll and permanent knife-edge for holding the staple, substantially as described.

2. The combination of a feed for introducing the material into the machine, the vibrating card and nippers, and the stationary cards, operating together in the manner substantially as described.

3. In combination with the nippers for receiving and carrying the cotton in tufts past or to the cards to be carded and straightened, the doffer for receiving said carded or combed tufts preparatory to their being formed into a continuous sliver, substantially as described.

4. In combination with the nippers for carrying and the doffer for receiving the cotton in tuft, the rolls for stripping the doffer and taking off the cotton in a continuous sliver, substantially as described.

MILTON D. WHIPPLE.

Witnesses:

S. W. HATHEWAY,
HORACE DANIELS.